United States Patent
Shalev et al.

(10) Patent No.: US 12,218,841 B1
(45) Date of Patent: Feb. 4, 2025

(54) ETHERNET TRAFFIC OVER SCALABLE RELIABLE DATAGRAM PROTOCOL

(71) Applicant: Amazon Technologies, Inc., Seattle, WA (US)

(72) Inventors: Leah Shalev, London (GB); Georgy Zorik Machulsky, San Jose, CA (US); Peter Nicholas DeSantis, Seattle, WA (US); Nafea Bshara, San Jose, CA (US); Omer Ilany, Superior, CO (US)

(73) Assignee: Amazon Technologies, Inc., Seattle, WA (US)

( * ) Notice: Subject to any disclaimer, the term of this patent is extended or adjusted under 35 U.S.C. 154(b) by 241 days.

(21) Appl. No.: 16/712,589

(22) Filed: Dec. 12, 2019

(51) Int. Cl.
| | |
|---|---|
| *H04L 47/10* | (2022.01) |
| *H04L 41/0816* | (2022.01) |
| *H04L 43/0829* | (2022.01) |
| *H04L 69/16* | (2022.01) |
| *H04L 69/163* | (2022.01) |

(52) U.S. Cl.
CPC .......... *H04L 47/10* (2013.01); *H04L 41/0816* (2013.01); *H04L 43/0829* (2013.01); *H04L 69/16* (2013.01); *H04L 69/163* (2013.01)

(58) Field of Classification Search
None
See application file for complete search history.

(56) References Cited

U.S. PATENT DOCUMENTS

| | | |
|---|---|---|
| 5,699,500 A | 12/1997 | Dasgupta |
| 6,788,686 B1 | 9/2004 | Khotimsky et al. |

(Continued)

FOREIGN PATENT DOCUMENTS

| | | |
|---|---|---|
| CN | 1625179 | 6/2005 |
| CN | 101848203 | 9/2010 |

(Continued)

OTHER PUBLICATIONS

"LibFabrics: Open Fabrics", OpenFabrics Interfaces Working Group, Accessed from Internet on Jan. 9, 2017, 6 pages <URL: htth://ofiwg.github.io/libfabric/>.

(Continued)

*Primary Examiner* — Derrick W Ferris
*Assistant Examiner* — Keith Follansbee
(74) *Attorney, Agent, or Firm* — Weaver Austin Villeneuve & Sampson LLP

(57) ABSTRACT

Methods and apparatuses for improving network packet transmission performance in terms of latency with reduced packet retransmission times and fewer packet drops in congested networks are provided. Packet-switched networks can experience long delays while waiting for out-of-order packets or re-transmissions of lost packets. In addition, network faults such as transmission path failures can result in excessive delay while attempting to find a new route over which to transmit packets. To improve packet transmission performance, application data may be encapsulated into first network packets by a first transport protocol having an interface exposed to the application, in the first network packets may be encapsulated into second network packets according to a second transport protocol. The second transport protocol can enable the second network packets of a same packet flow to be transmitted across multiple paths over the network.

20 Claims, 8 Drawing Sheets

(56) References Cited

U.S. PATENT DOCUMENTS

| | | |
|---|---|---|
| 6,990,528 B1 | 1/2006 | Neal et al. |
| 7,088,718 B1 | 8/2006 | Srivastava |
| 7,171,484 B1 | 1/2007 | Krause et al. |
| 7,293,107 B1* | 11/2007 | Hanson .................. H04W 8/02 |
| | | 455/432.1 |
| 7,912,064 B2 | 3/2011 | Elzur |
| 7,913,077 B2 | 3/2011 | Ko et al. |
| 8,031,729 B2 | 10/2011 | Elzur |
| 8,190,960 B1 | 5/2012 | Bahadur et al. |
| 9,654,385 B2 | 5/2017 | Chu et al. |
| 9,667,723 B2 | 5/2017 | Pandya |
| 9,747,249 B2 | 8/2017 | Cherian et al. |
| 9,985,903 B2 | 5/2018 | Shalev et al. |
| 9,985,904 B2 | 5/2018 | Shalev et al. |
| 10,148,570 B2 | 12/2018 | Shalev et al. |
| 10,375,167 B2 | 8/2019 | Shamis et al. |
| 10,430,373 B2 | 10/2019 | Cherian et al. |
| 10,498,654 B2 | 12/2019 | Shalev et al. |
| 10,645,019 B2 | 5/2020 | Shalev et al. |
| 10,673,772 B2 | 6/2020 | Shalev et al. |
| 10,917,344 B2 | 2/2021 | Shalev et al. |
| 2002/0198927 A1 | 12/2002 | Craddock et al. |
| 2003/0031183 A1 | 2/2003 | Kashyap et al. |
| 2003/0035433 A1 | 2/2003 | Craddock et al. |
| 2003/0053457 A1 | 3/2003 | Fox et al. |
| 2003/0065856 A1 | 4/2003 | Kagan et al. |
| 2003/0200315 A1 | 10/2003 | Goldenberg et al. |
| 2004/0003126 A1 | 1/2004 | Boucher et al. |
| 2004/0042458 A1 | 3/2004 | Elzu |
| 2004/0042483 A1 | 3/2004 | Elzur et al. |
| 2004/0044796 A1 | 3/2004 | Vangal et al. |
| 2004/0049612 A1 | 3/2004 | Boyd et al. |
| 2004/0049774 A1 | 3/2004 | Boyd et al. |
| 2004/0190516 A1 | 9/2004 | Williams |
| 2005/0060442 A1 | 3/2005 | Beverly et al. |
| 2005/0144310 A1 | 6/2005 | Biran et al. |
| 2005/0180327 A1 | 8/2005 | Banerjee et al. |
| 2006/0007935 A1 | 1/2006 | Bennett et al. |
| 2006/0075067 A1 | 4/2006 | Blackmore et al. |
| 2006/0101090 A1 | 5/2006 | Aloni et al. |
| 2006/0101225 A1 | 5/2006 | Aloni et al. |
| 2006/0168274 A1 | 7/2006 | Aloni et al. |
| 2007/0208820 A1 | 9/2007 | Makhervaks et al. |
| 2008/0043750 A1 | 2/2008 | Keels et al. |
| 2009/0106771 A1 | 4/2009 | Benner et al. |
| 2009/0219939 A1 | 9/2009 | Isosaari |
| 2009/0222564 A1 | 9/2009 | Freimuth et al. |
| 2011/0149977 A1 | 6/2011 | Thomas et al. |
| 2011/0280247 A1* | 11/2011 | Roskind ................ H04L 69/163 |
| | | 370/401 |
| 2012/0023304 A1 | 1/2012 | Chan et al. |
| 2012/0089694 A1 | 4/2012 | Pandya |
| 2012/0155458 A1 | 6/2012 | Larson et al. |
| 2012/0155468 A1 | 6/2012 | Greenberg et al. |
| 2012/0265837 A1 | 10/2012 | Grant et al. |
| 2012/0281714 A1 | 11/2012 | Chang et al. |
| 2012/0287944 A1 | 11/2012 | Pandit et al. |
| 2013/0051222 A1 | 2/2013 | Gavrilov et al. |
| 2013/0080561 A1 | 3/2013 | Fox et al. |
| 2013/0114606 A1 | 5/2013 | Schrum, Jr. et al. |
| 2013/0145035 A1 | 6/2013 | Pope et al. |
| 2013/0268980 A1 | 10/2013 | Russell |
| 2013/0304796 A1 | 11/2013 | Jackowski et al. |
| 2013/0315237 A1 | 11/2013 | Kagan et al. |
| 2014/0052808 A1 | 2/2014 | Krishnan et al. |
| 2014/0153572 A1 | 6/2014 | Hampel et al. |
| 2014/0310369 A1 | 10/2014 | Makhervaks et al. |
| 2014/0358972 A1 | 12/2014 | Guarrieri et al. |
| 2015/0010090 A1 | 1/2015 | Sugimoto |
| 2015/0052280 A1 | 2/2015 | Lawson |
| 2015/0124652 A1 | 5/2015 | Dharmapurikar et al. |
| 2015/0127797 A1 | 5/2015 | Attar et al. |
| 2015/0163144 A1 | 6/2015 | Koponen et al. |
| 2015/0172226 A1 | 6/2015 | Borshteen et al. |
| 2015/0179227 A1 | 6/2015 | Russell |
| 2015/0263932 A1 | 9/2015 | Chunduri et al. |
| 2015/0373165 A1 | 12/2015 | Anand et al. |
| 2016/0026604 A1 | 1/2016 | Pandit et al. |
| 2016/0094356 A1 | 3/2016 | Xiang et al. |
| 2016/0212214 A1 | 7/2016 | Rahman et al. |
| 2016/0226755 A1 | 8/2016 | Hammam et al. |
| 2016/0234127 A1 | 8/2016 | Agarwal et al. |
| 2016/0344633 A1 | 11/2016 | Jiao et al. |
| 2017/0006142 A1 | 1/2017 | Kwon |
| 2017/0134535 A1 | 5/2017 | Osamura et al. |
| 2017/0171075 A1 | 6/2017 | Sajeepa et al. |
| 2017/0187496 A1 | 6/2017 | Shalev |
| 2017/0187621 A1* | 6/2017 | Shalev .................. H04L 45/745 |
| 2017/0187629 A1* | 6/2017 | Shalev ................ H04L 43/0823 |
| 2017/0187846 A1 | 6/2017 | Shalev |
| 2017/0195240 A1 | 7/2017 | Chen et al. |
| 2017/0223154 A1 | 8/2017 | Hammam et al. |
| 2017/0346742 A1 | 11/2017 | Shahar et al. |
| 2018/0004705 A1 | 1/2018 | Menachem et al. |
| 2018/0219980 A1* | 8/2018 | McCulley ............... H04L 69/40 |
| 2019/0363989 A1 | 11/2019 | Shalev et al. |
| 2020/0259759 A1 | 8/2020 | Shalev et al. |
| 2021/0119930 A1* | 4/2021 | Debbage ............... H04L 1/1642 |

FOREIGN PATENT DOCUMENTS

| | | |
|---|---|---|
| CN | 103929492 | 7/2014 |
| CN | 103986647 | 8/2014 |
| CN | 104541257 | 4/2015 |
| CN | 104620664 | 5/2015 |
| JP | 2002305535 | 10/2002 |
| JP | 2004531175 | 10/2004 |
| JP | 2005524264 | 8/2005 |
| JP | 2008507201 | 3/2008 |
| JP | 2015050746 | 3/2015 |
| WO | 2013169073 | 11/2013 |

OTHER PUBLICATIONS

"Open Fabrics Software", OFED Overview. Open Fabrics Alliance, Sep. 7, 2015, 2 pages <URL: https://www.openfabrics.org/index.php/openfabrics-software.html>.

Bryant et al., "Pseudowire Emulation Edge-to-Edge (PWE3) Control Word for Use over an MPLS PSN", XP015044817, Feb. 1, 2006, 12 pages.

Russell, "Introduction to RDMA Programming", University of New Hampshire InterOperability Laboratom, 2012, 76 pages <URL: http://www.cs.unh.edu/~rdr/rdma-intro-module.ppt>.

* cited by examiner

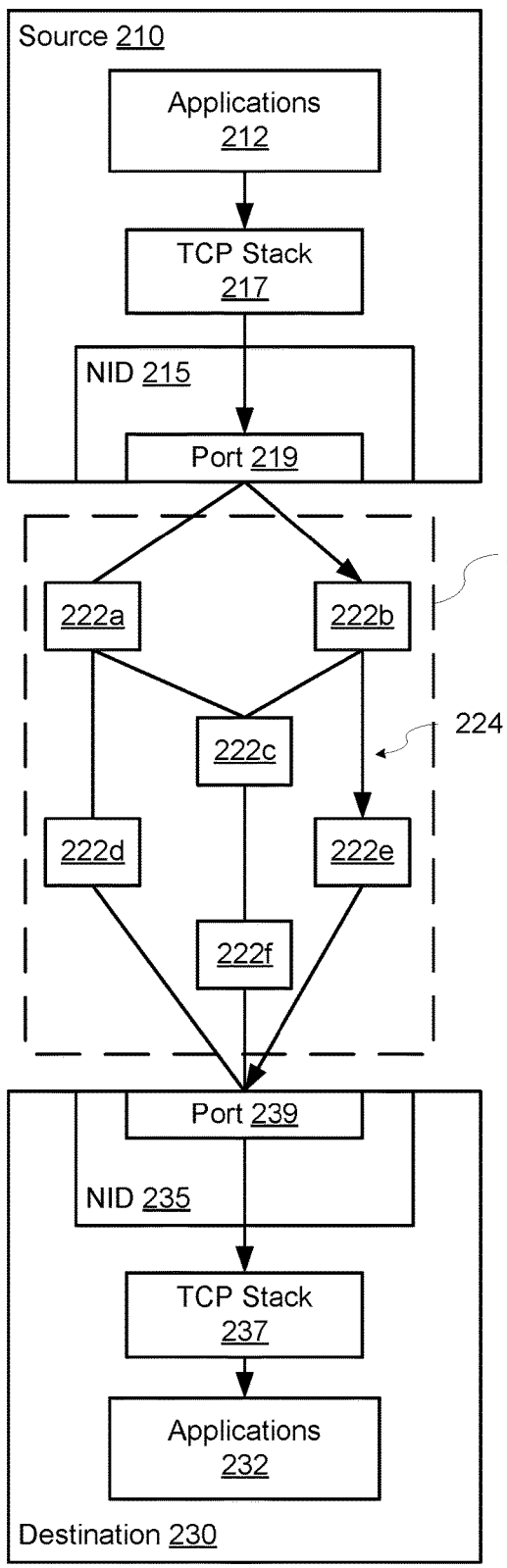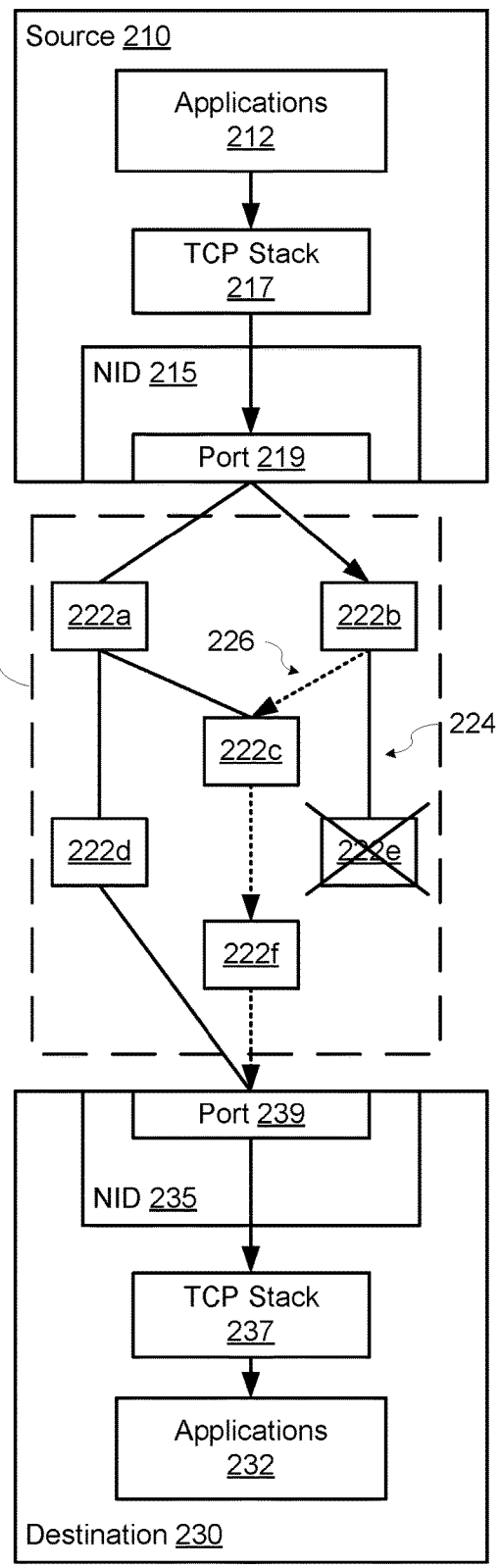
FIG. 2A
FIG. 2B

ETHERNET TRAFFIC OVER SCALABLE RELIABLE DATAGRAM PROTOCOL

BACKGROUND

Networks can be implemented as packet-switched networks that include devices such as servers that manage workloads and respond to client requests, switches that connect devices together, routers that perform packet forwarding functions, etc. The devices may communicate over an Ethernet local area network (LAN) using transport protocols such as Transmission Control Protocol (TCP) and User Datagram Protocol (UDP).

TCP provides application-to-application connectivity at the transport layer of the protocol stack. At the transport layer, TCP handles all handshaking and transmission details and presents an abstraction of the network connection to an application typically through a network socket interface. TCP detects packets that are lost, duplicated, or delivered out of order, and requests re-transmission of the packets. If the data still remains undelivered, the source is notified of this failure. However, TCP is optimized for accurate delivery and can incur relatively long delays while waiting for out-of-order packets or re-transmissions of lost packets.

UDP uses a simple connectionless communication model with a minimum of protocol mechanisms. UDP provides checksums for data integrity, and port numbers for addressing different functions at the source and destination. It has no handshaking dialogues, and thus exposes applications to any unreliability of the underlying network; there is no guarantee of delivery, ordering, or duplicate protection.

BRIEF DESCRIPTION OF THE DRAWINGS

Various embodiments in accordance with the present disclosure will be described with reference to the drawings, in which:

FIGS. 2A and 2B are diagrams illustrating simplified examples of a packet flow from a source device to a destination device over a network;

DETAILED DESCRIPTION

Figure 1:
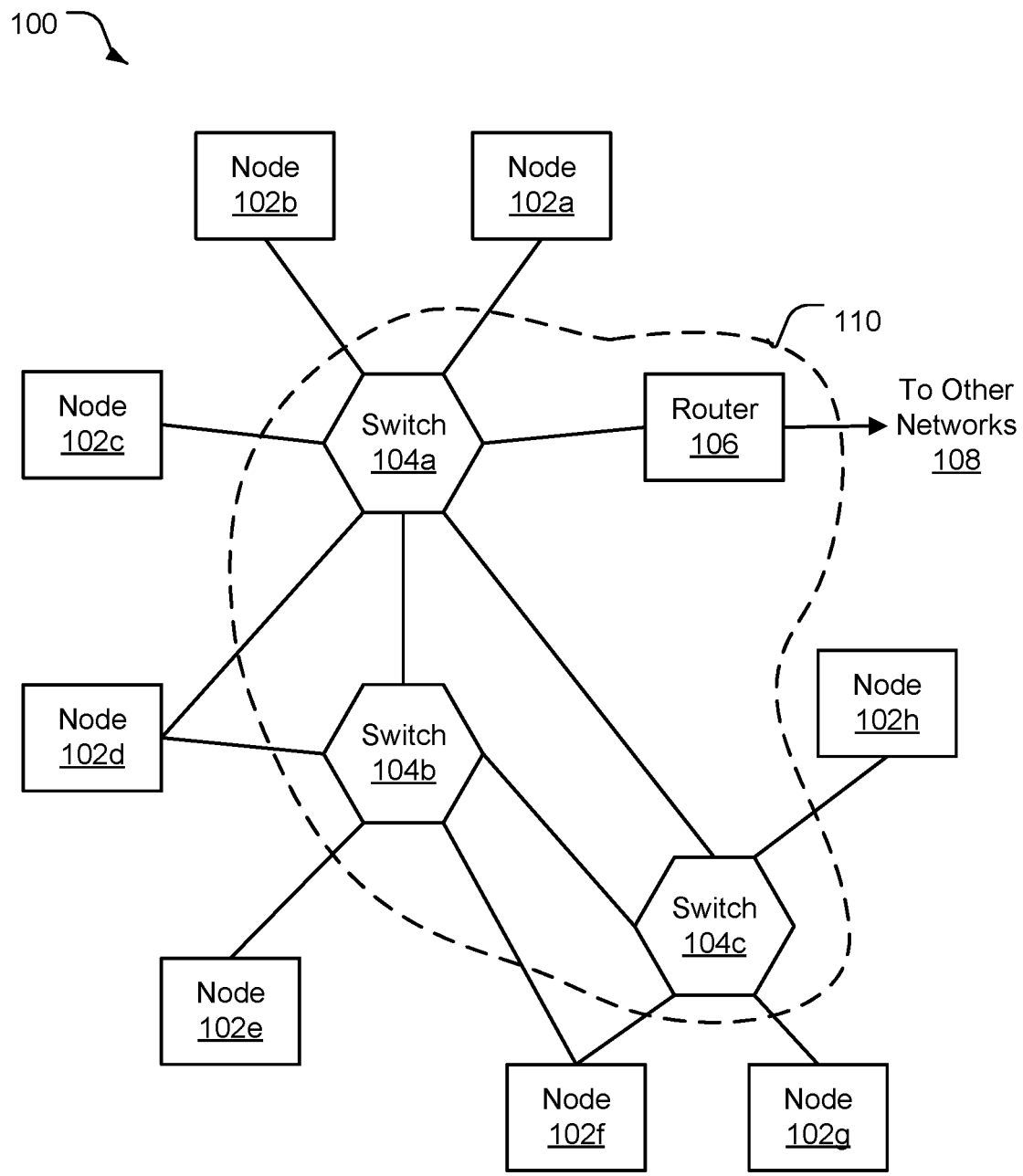
FIG. 1 is a diagram illustrating an example of a group of computing resources connected via a network.

FIG. 1 is a diagram illustrating an example of a group of computing resources 100 connected via a network 110. The group of computing resources 100 may be connected with switches, and in some implementations may be configured to run in parallel. In some implementations, the various computing resources may form a single logical computing resource. The example group of computing resources 100 illustrated in FIG. 1 may include multiple nodes 102a-h and switches 104a-c. In some implementations, the group of computing resources may also include a router 106.

The nodes 102a-h illustrated in FIG. 1 may represent various computing resources. For example, one or more nodes 102a-h may be a computer, such as a server computer. The computers may include one or more processors, and these processors may include one or more processing cores. These computers may also include memory and peripheral devices. In some implementations, these computers may use an adapter device to connect to a switch 104a-c in the group of computing resources 100. Other examples of computing resources include storage devices (e.g., hard drives), storage subsystems (e.g., an array of storage devices), Input/Output (I/O) modules, and consoles for administration access to the group of computing resources 100.

The switches 104a-c may provide connectivity between the various nodes 102a-h. Each node 102a-h may be connected to the group of computing resources 100 through a connection with a switch 104a-c. In some cases, a node 102a-h may be connected to more than one switch 104a-c. Switches may also be connected to other switches. In most cases, any port on a switch 104a-c may be used to connect to either a node 102a-h or another switch. In most implementations, the size of the group of computing resources 100 can quickly and easily be expanded by connecting more switches and nodes.

The switches 104a-c may provide multiple paths from any node 102a-h to any other node 102a-h. A switch 104a-c may have multiple connections with another switch 104a-c, which provides additional paths between the switches 104a-c. In some cases, the nodes 102a-h may be connected to more than one switch 104a-c, also creating more paths. Packets from one node 102a-h may use multiple paths at the same time to reach another node 102a-h. Alternatively or additionally, packets from one node 102a-h to another node 102a-h may follow only one path. In some cases, at each switch 104a-c a decision may be made as to which path a packet will follow. In other cases, a packet's path may be determined in advance, typically at the source node. A stream of packets from one node 102a-h to another node 102a-h may be referred to as a packet flow, or simply as a "flow." In some cases, the packets in a flow are related, such as for example when the packets together form one message.

In some implementations, the group of computing resources 100 may be connected to a router 106. The router 106 may provide a connection to other networks 108, such as other networks or sub-networks (subnets), or Local Area Networks (LANs). The interconnected switches 104a-c (and the router 106, if present) may be referred to as a switch fabric, fabric, or network 110. Herein, the terms "fabric" and "network" may be used interchangeably. The protocol used for communication between the nodes should provide high bandwidth and low latency. High bandwidth means that a large volume of traffic should be able to traverse the network, and low latency means that the traffic should be able to travel from source to destination as quickly as possible.

In some implementations, the individual computing resources may work cooperatively to solve a large problem that one computer may not be able to solve alone, or may take a very long time to solve alone. In some cases, a computing cluster may provide performance similar to a super computer but for less cost and with less complexity.

The switched fabric architecture used by a computing cluster may also have the advantage of being fault tolerant and scalable. Multiple paths between the nodes may also keep aggregate bandwidth high, and provide redundant connections in case of link failures.

Transmission Control Protocol (TCP) is a connection-oriented protocol that provides host-to-host connectivity at the transport layer of the protocol stack. Part of the function of establishing a connection is creating the mechanism to track data that has been sent and acknowledge what is received. Each byte of data sent in a TCP connection has an associated sequence number indicated on the sequence number field of the TCP header. When the receiving socket detects an incoming segment of data, it uses the sequence number in the TCP header to acknowledge receipt. After sending a packet of data, the sender will start a retransmission timer of certain duration. If it does not receive an acknowledgment before the timer expires, the sender will assume the segment has been lost and will retransmit it.

However, TCP is optimized for accurate delivery rather than timely delivery and can incur relatively long delays (on the order of seconds) while waiting for out-of-order packets or re-transmissions of lost packets. For example, TCP may suffer from packet latency outliers (tail latency) due to failures in the underlying physical network and limitations on bandwidth on the single connection imposed to ensure different flows by different users do not interfere with each other and do not cause a noisy neighbor effect on the switches and physical network.

User Datagram Protocol (UDP) uses a simple connectionless communication model with a minimum of protocol mechanisms, using checksums for data integrity and port numbers for addressing different functions at the source and destination of the datagram. UDP provides no handshaking dialogues, and thus exposes applications to any unreliability of the underlying network; there is no guarantee of packet delivery, ordering, or duplicate protection. UDP is thus an unreliable protocol.

In some implementations, networks may include devices such as servers that manage workloads and respond to client requests, switches that connect devices together; routers that perform packet forwarding functions; etc. The devices may communicate over packet-switched Ethernet LANs using TCP or UDP. A network adapter, for example, Elastic Network Adapter (ENA), may be used by applications for networking. ENA may expose an Ethernet network device interface to the host system. The network interface for ENA sends packets over an equal cost multi-path (ECMP) to a destination ENA network interface. Each switch will typically choose the same port for the packets on the same application flow, and the packets will follow the same path unless some event happens, for example, a switch failure. In cases of such an event, the routing will eventually be changed and a different path for the packets will be chosen. However, choosing a new path may take a long time. Thus, a given packet flow that was using the failed flow device will not be able to pass any traffic from source to destination until the problem is resolved.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIGS. 2A and 2B are diagrams illustrating simplified examples of a packet flow from a source device to a destination device over a network. Referring to FIG. 2A, a source application 212 executing on a source host device 210, for example, a computer, a server, or other network device, may have data to transmit to a destination application 232 executing on a destination host device 230, for example, another computer, server, or network device, connected to the network. The source application 212 may pass the data to a TCP stack 217 implemented on the source host device 210. The source host device 210 may interface with the network 220 via a network interface device 215 (e.g., an Ethernet interface device). The TCP stack 217 may generate TCP packets including the data and header information for transmitting the packets and pass the packets to a switch fabric 220 via a first port 219 of the network interface device 215, and a path 224 through the switch fabric 220 may be chosen.

Each packet may be transmitted through the switch fabric 220 having switches 222a-222f over a same path 224. For example, the packets may be transmitted over the path 224 from switch 222b to switch 222e to the second port 239 of a destination network interface device 235 of the destination device 230 as indicated by the arrows in switch fabric 220 of FIG. 2A. The packets may be received via the second port 239 on the destination network interface device 235 and passed to the TCP stack 237 of the destination host device 230. The TCP stack 237 may send an acknowledgment that the packets have been received to the source host device 210 and forward the packets to the destination application 232.

If a failure in the transmission path 224 occurs, for example, a switch 222e fails as shown in FIG. 2B, packets transmitted over the path 224 will no longer be received at the destination host device 230. When acknowledgments from the destination host device 230 are not received, the TCP stack 217 of the source host device 210 will attempt retransmission of the unacknowledged packets. After a period of time without receiving acknowledgments, an alternate path 226 as indicated by the dotted arrows through the switch fabric 220 may be determined. The time required for retransmission attempts and choosing the alternate path 226 through the switch fabric 220 may result in unacceptably long communication delays between the source and destination devices.

In accordance with aspects of the present disclosure, systems and methods for implementing a network adapter over a Scalable Reliable Datagram (SRD) transport protocol are provided. A first protocol module implemented on a host device may implement a TCP and/or UDP transport protocol and a second protocol module implemented on a network adapter may implement a SRD transport protocol. The SRD protocol can provide reduced latency and recover quickly from network path faults, as well as detect and retransmit lost packets faster than TCP, in most cases before TCP detects a packet is missing. While various embodiments may be described with respect to TCP/UDP and SRD transport layer protocols, other transport layer protocols (e.g., protocols operating at the transport layer or layer 4 of the Open Systems Interconnection (OSI) model) may be implemented by the first and second protocol modules without departing from the scope of the present disclosure. The SRD transport protocol may also be referred to as the Relaxed Reliable Datagram (RRD) transport protocol.

The SRD transport protocol may enable the use of multiple paths to send packets of the same user flow in parallel over the network. Using multiple paths in parallel enables the spreading of packets of a given flow onto different paths to reduce overall latency and improve reliability. Thus, if problems are seen (e.g., congestion on a particular path), paths can be quickly switched and the packets may be retransmitted over a different path. Recovery from failed network equipment can happen quickly and does not depend on routing changes.

The underlying SRD protocol can process retransmission requests for dropped packets before the actual TCP mechanism detects that a packet is missing. For example, with TCP, when a packet is dropped on a network switch, TCP can detect the missing packet using a timeout mechanism (e.g., using a timer in a range of 50 ms), while SRD is able to detect and retransmit missing packets in less than one millisecond. Thus, before TCP will detect a retransmission timeout, SRD may detect the timeout and cause a packet retransmission. The packet may be retransmitted on a different path. Even with multiple retransmissions, SRD can retransmit and deliver the packet to the destination before TCP detects that the packet is lost. From the TCP perspective, the packet is delivered with no knowledge that the packet was actually retransmitted by SRD.

Figure 3:
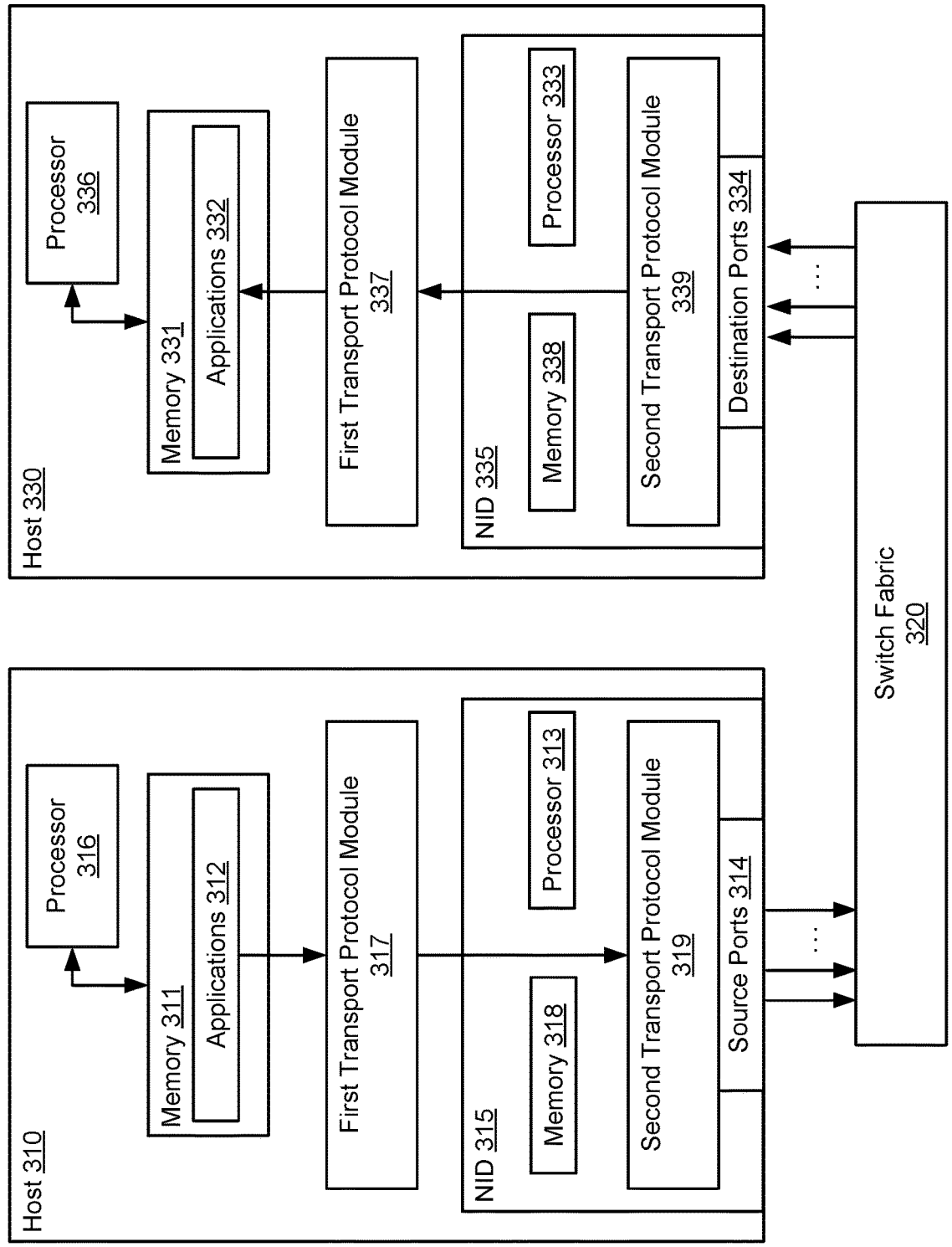
FIG. 3 is a diagram illustrating an example of a computer system having a network interface device according to aspects of the present disclosure.

FIG. 3 is a diagram illustrating an example of a computer system having a network interface device according to aspects of the present disclosure. Referring to FIG. 3, a host computing device 310, 330 may be, for example, a computer system, a server, or other network connected device. A host computing device 310, 330, may act as a source device that generates packets to be transmitted over a network and/or a destination device that receives packets generated by a source device. Any network connected device may act as a source device or a destination device at various times. In the example of FIG. 3, the host computing device 310 may act as a source network device and the host computing device 330 may act as a destination network device during certain operations.

The source host device 310 may include a processor 316, a memory 311, and a source network interface device (NID) 315, also referred to herein as a network interface adapter. The source network interface device 315 may include a processor 313 and a memory 318. The source host device 310 may implement a first source transport protocol module 317. The first source transport protocol module 317 may expose an interface associated with the first transport protocol to the applications 312 executing on the source host device 310. The first source transport protocol module 317 may format data received from applications executing on the source host device 310 into first packets according to a first transport protocol. The source network interface device 315 may implement a second source transport protocol module 319 to format the first packets into second packets for transmission over the network according to a second transport protocol. The second transport protocol may add sequence numbers to the second packets. The source network interface device 315 may include source ports 314 configured to interface with a switch fabric 320, also referred to as the network 320. The first transport protocol may be, for example, the TCP transport protocol, the UDP transport protocol, or another transport layer protocol, and the second transport protocol may be, for example, the SRD transport protocol or another transport layer protocol.

In some implementations, the first transport protocol module may be implemented in a host device and the second transport protocol module may be implemented in a network interface device. In these implementations, the first transport protocol module may be implemented as a software module, and the second transport protocol module may be implemented in hardware (e.g., circuitry) or software or a combination of hardware and software. In other implementations, the first transport protocol module and the second transport protocol module may be implemented in a host device. In these implementations, the first transport protocol module and the second transport protocol module may be implemented as software modules. In still other implementations, the first transport protocol module and the second transport protocol module may be implemented in a network interface device. In these implementations, the first transport protocol module and the second transport protocol module may be implemented in hardware (e.g., circuitry) or software or a combination of hardware and software. While examples described in the present disclosure may be explained in terms of a first transport protocol module implemented on a host device and a second transport protocol module implemented on a network interface device, it should be appreciated that the disclosed aspects apply to other configurations such as, but not limited to, the implementations described above.

Similarly, the destination host device 330 may include a processor 336, a memory 331, and a destination network interface device (NID) 335. The destination network interface device 335 may include a processor 333 and a memory 338. The destination host device 330 may implement a first destination transport protocol module 337. The first destination transport protocol module 337 may expose an interface associated with the first transport protocol to the applications 332 executing on the destination host device 330. The destination network interface device 335 may implement a second destination transport protocol module 339. The destination network interface device 315 may include destination ports 334.

Second packets transmitted over the network 320 by the source host device 310 may be received by the second destination transport protocol module 319 of the destination host device 330 via the destination ports 334. The second destination transport protocol module 319 may reorder the received second packets based at least in part on, for example, additional sequence numbers, remove the second transport protocol formatting, and pass the reordered packets to the first destination transport protocol module 337 as first packets. Additionally, the second destination transport protocol module 319 may communicate with the second source transport protocol module 319 of the second transport protocol module 319 of the source host device 310 for retransmission of second packets that are corrupted or dropped by the network 320.

The first destination transport protocol module 337 may receive the first packets from the second destination transport protocol module 319 and remove the first transport protocol formatting to acquire the data from the first packets. The first destination transport protocol module 337 may pass the acquired data to applications executing on the destination host device 330 via an interface associated with the first transport protocol exposed to the applications 332 executing on the destination host device 330.

According to aspects of the present disclosure, when a source application 312 executing on the source host device 310 has data to be sent to a destination application 332 executing on the destination host device 330, the source application 312 may pass the data to the first source transport protocol module 317 via the interface exposed to the source application 312.

The first source transport protocol module 317 may encapsulate the data into first network packets according to the first transport protocol. For example, the first source transport protocol module 317 may format the data into a packet payload and add packet header information to the first packets according to the first transport protocol. The first source transport protocol module 317 may pass the first network packets to the second source transport protocol module 319.

The second source transport protocol module 319 may add additional header information to encapsulate the first network packets according to the second transport protocol. For example, the second source transport protocol module 319 may add more header information to each first network packet including a flow identification (flow ID) and sequence numbers according to the second transport protocol.

Figure 4:
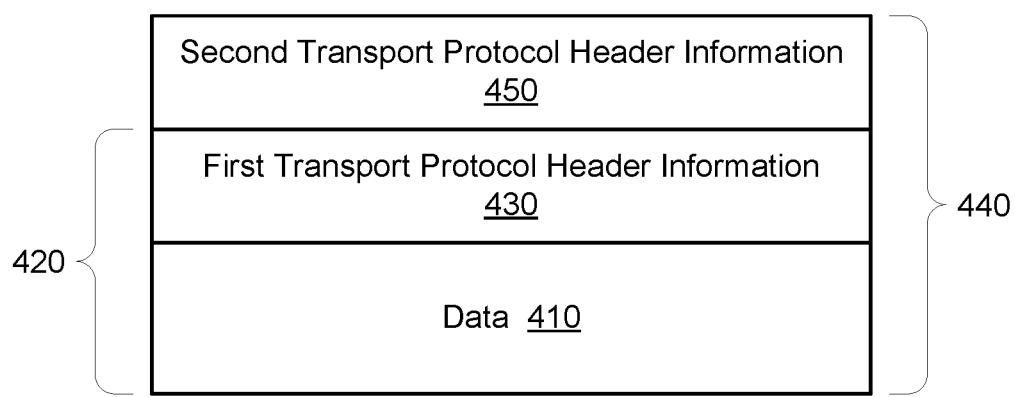
FIG. 4 is a diagram illustrating an encapsulated network packet according to aspects of the present disclosure.

FIG. 4 is a diagram illustrating an encapsulated network packet according to aspects of the present disclosure. Referring to FIG. 4, data 410 from an application may be formatted (e.g., encapsulated) into a first network packet 420 according to the first transport protocol. For example, the data may be encapsulated into a network packet by adding first transport protocol header information 430 to form the first network packet 420. The first network packet 420 may then be encapsulated according to the second transport protocol to generate the second network packet 440. For example, the first network packet 420 may be encapsulated into a second network packet by adding second network transport protocol header information 450 to form the second network packet 440. The second transport protocol header information 450 may include a sequence number and a flow identifier. From the perspective of the application, the data may appear as being sent via a typical Ethernet device. In other words, the source application 312 may be unaware that the packets are encapsulated according to the second transport protocol when being transmitted to the destination.

In some implementations, the first transport protocol may be TCP or UDP and the second transport protocol may be SRD. In such implementations, TCP or UDP packets may be passed from the first source transport protocol (e.g., TCP or UDP) module to the second source transport protocol (e.g., SRD) module. The SRD protocol module may encapsulate the TCP or UDP packet according to the SRD transport protocol, including an SRD sequence number, and may assign a network path for each packet independent of the application flow to which the packet belongs.

Returning to FIG. 3, the source network interface device 315 may cause the SRD packets of the same application flow to be distributed over different paths across the network (e.g., switch fabric 320). Spreading the traffic across multiple paths is handled by the SRD transport protocol and may include header modifications to enforce various routing or forwarding decisions for different packets. For example, various distribution algorithms (e.g., round-robin, equal-cost multipath (ECMP), random packet spring (RPS), etc.) may be used to distribute the SRD packets between the source ports 314 to maintain reliable transmission and delivery of the SRD packets to the destination. The SRD transport protocol may establish connections between source ports 314 and destination ports 334.

Figure 5:
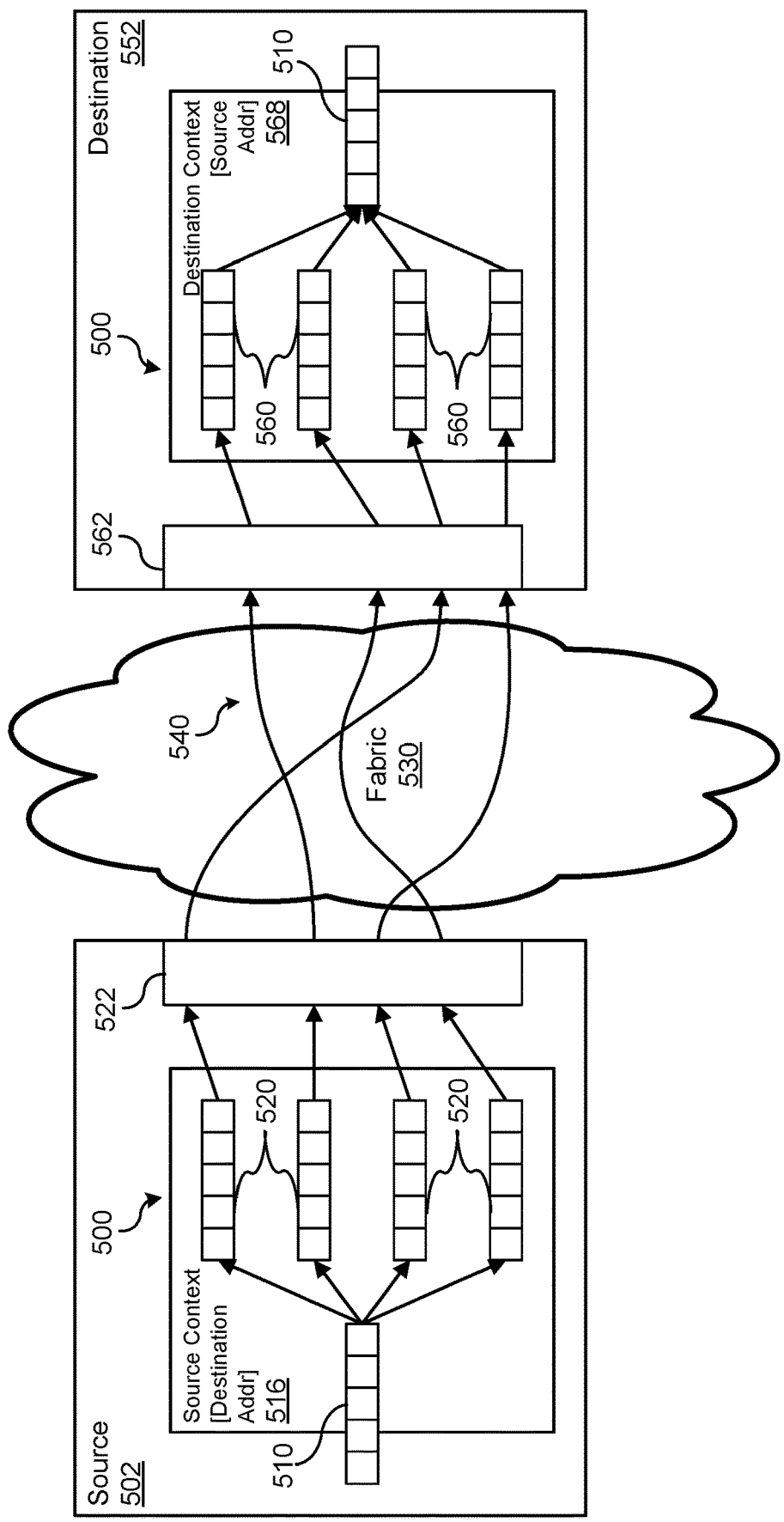
FIG. 5 is a diagram illustrating an example of multiple paths across a network managed by the Scalable Reliable Datagram (SRD) transport according to aspects of the present disclosure.

FIG. 5 is a diagram illustrating an example of multiple paths across a network managed by the second transport protocol according to aspects of the present disclosure. The second transport protocol may be, for example, the Scalable Reliable Datagram (SRD) transport protocol. SRD can achieve greater utilization across available network paths. The SRD transport protocol can guarantee ordering, for example by tracking packet order state for each of the flows from the source-side to the destination-side, or serializing packets that belong to different logical flows into a single sequence of packets. In some implementations, the destination network interface device may buffer a certain amount of second packets (SRD packets) and then re-order them before providing them to the first destination transport protocol module 317 (e.g., a TCP or UDP transport protocol module). The second transport protocol (e.g., SRD) thus may provide packet re-ordering as well as guarantee that all packets are delivered.

In a computer network (e.g., the group of computing resources illustrated in FIG. 1), there may be multiple paths that packets can take to travel across the network from a source system to a destination system. A stream of packets from one source application to one destination application may be called a flow of packets of the same application flow or, more simply, an application flow. The packets in a flow may be related to each other (e.g., they belong to one continuous stream of data, such as a video or a conversation), and a flow may end and restart (e.g., the video or conversation may end, and a new one may begin). Greater efficiency across the cluster may be achieved when packets from a given source to a specific destination are spread across all available paths. Existing transport services, however, are typically designed for in-order packet delivery, and may be configured to send one flow over only one path to ensure the probability of in-order packet arrival and to reduce performance degradation. These transport services typically are able to change paths only when one flow ends and another begins.

Referring to FIG. 5, the transport protocol (e.g., SRD) may manage multiple paths 540 across a network 530 to achieve greater utilization across available paths 540. In the example of FIG. 5, a flow 510 of packets from a source system 502 to a destination system 552 may be divided into groups of packets, which may be referred to as "flowlets" 500. The flow 510 of packets may be received by a second transport protocol module (e.g., the second source transport protocol module 319 in FIG. 3) from a source transport protocol module (e.g., the first source transport protocol module 317 in FIG. 3), for example, a TCP or UDP transport protocol module, having an interface exposed to the applications executing on the source system. Transport layers of the second transport protocol modules for the source and destination systems 502, 552 may implement transport contexts 516, 568 to establish a connection between the source and destination systems. The transport contexts 516, 568 may be implemented in the source and destination network interface devices as hardware (e.g., circuitry), software, or a combination of hardware and software. In some implementations, the transport contexts may be implemented in the host devices as software.

The source transport context 516 and the corresponding destination transport context 568 may manage transmit and receipt of the flowlets 500, including setting up and taking down the paths across the network 530. The source and destination contexts 516, 568 may also monitor the status of packets on a per-flowlet 500 basis. Each flowlet 500 may be transmitting over a different path 540, with all packets in one flowlet 500 using the same path. In some implementations, all packets are transmitted from the source system 502 over one port 522, and are received at the destination system 552 at one port 562. In other implementations, the source system 502 and/or the destination system 552 may have multiple ports connected to the network 530.

In some implementations, a source context 516 may be associated with one destination context 568. The source context 516 may be identified by an address associated with the destination system 552. This destination address may be assigned to the destination context 568. Similarly, the destination context 568 may be identified by an address at the source system 502 that has been assigned to the source context 516. The source context 516 may manage transmit of a flow 510 of packets, which may include packets from multiple user applications running at the source system 502. The packets in the flow 510 would all be destined for user applications running on the destination system 552. The destination context 568 may manage receipt of the packets in the flow 510 at the destination system 552.

Four flowlets 500 are illustrated in FIG. 5. In various implementations, more or fewer flowlets 500 may be used by the transport contexts 516, 568. In some implementations, the number of flowlets 500 between the source system 502 and the destination system 552 may be configurable, and/or may be limited only by the number of available paths 540 between the two systems 502, 552.

User applications running on the source system 502 and the destination system 552 may be unaware of the flowlets 500, and may interact only with standard libraries and/or driver programs. Packets from various sources may be placed into the same flow 510 when the packets are addressed to the same destination system 552. Packets from the flow 510 may be assigned to flowlets 500 such that the packets are distributed evenly across the flowlets 500. Alternatively or additionally, packets may be assigned so that flowlets 500 that are under-utilized and running low on packets are assigned additional packets first. Flowlets 500 that run low on packets quickly may be using faster paths, and assigning packets to these flowlets 500 may improve overall utilization and throughput.

The source context 516 may track packets on a per-flowlet 500 basis. Each flowlet 500 may maintain a packet sequence number, and as packets from the flow 510 are assigned to a flowlet 500 each packet may also be assigned the next packet sequence number for that flowlet 500. Packets may also be assigned a flowlet identifier, which may be used by the destination context 568 to identify each packet's flowlet and path.

For each flowlet 500, the source system 502 may maintain status information 520 for each packet assigned to the flowlet 500. The status information 520 may include each packet's packet sequence number and any information that may be needed to retransmit a packet. In most cases, the status information 520 may be maintained for a packet from the time the packet is transmitted until the source system 502 receives an acknowledgment that the packet was received.

The destination context 568 may also track packets on a per flowlet 500 basis, with its own status information 560. The status information 560 maintained by the destination context 568 may also include packet sequence numbers for each flowlet 500. The destination context 568 may use the status information 560 to generate acknowledgements that are transmitted to the source system 502. Acknowledgements may inform the source context 516 that packets for a particular flow have arrived at the destination system 552, and typically indicate which packets have arrived.

Packets from each flowlet 500 may be transmitted by the source system 502 in the order of their packet sequence numbers. The first packet sent from a flowlet 500 may also include a "start-of-sequence" indicator to inform the destination context 568 that the particular flowlet 500 is starting. The destination context 568 may then use the packet sequence number in the packet with the start-of-sequence indicator to establish the status for that flowlet 500. The destination context 568 subsequently expects packets for that flowlet 500 to arrive in the order of their packet sequence numbers.

Packets, however, may be dropped in the network 530, and may never arrive at the destination system 552. For example, the destination system may receive packets with the packet sequence numbers "1, 3," which indicates that the packet with the packet sequence number "2" may have been dropped. The packet status maintained by both the source context 516 and the destination context 568 may enable the contexts 516, 568 to identify when packets have been dropped in the network 530, and to retransmit any packets that were lost.

Drops in the network 530 and slowness caused by excessive use of links in the network 530 may affect performance, and thus it is typically desirable to avoid or minimize both. The source context 516 may detect excessive drops or congestion along a path in a number of ways. For example, the status information 520 for a flowlet 500 may include a timer that the source context 516 can use to determine the time between when a packet was transmitted and when an acknowledgment for that packet was received. A long time period may indicate congestion along the path being used by the flowlet 500. Alternatively or additionally, the source context 516 may track how quickly it can add packets to each flowlet 500. A flowlet 500 that cannot accept packets as quickly as other flowlets 500 may be suffering congestion along its path 540 across the network, and/or may be suffering excessive drops. Alternatively or additionally, the source context 516 may be receiving a large number of retransmission requests for a particular flowlet 500, which may indicate excessive drops along the path the flowlet 500 is using.

When the source context 516 determines that a flowlet 500 may be suffering from congestion or excessive drops, the source context 516 may change the path identifier to move the flowlet 500 to another path 540.

Packet drops in the network 530, path 540 switching, disconnects, and flowlet restarts may each lead to packets needing to be resent. When received at the destination system 552, these resent packets will be out of sequence from packets received before. For example, the destination context 568 may have received packets with the sequence numbers "1, 3" and thus may have indicated that the packet with sequence number "2" needed to be resent. Once the packet with the sequence number "2" has been resent, the destination context 568 will have the sequence numbers "1, 3, 2" for this particular flowlet 500.

The destination context 568 may be configured to expect packets to arrive out of order in this manner. The destination context 568, in cooperation with the source context 516, in most implementations ensures that all packets are received. Packets may be in a different order at the destination end of the flow 510 from the order they were in at the source end of the flow 510. The destination context 568 may re-order the packets, for example, based at least in part on additional sequence numbers, before passing the packets to the first destination transport protocol (e.g., TCP or UDP) module of the destination system 552.

As discussed above, the source context 516 and the destination context 568 may each maintain status information 520, 560 for each individual flowlet 500. Using the status information 520, 560, the source and destination contexts 516, 568 may ensure that every packet in the flow 510 reaches the destination system 552.

Referring again to FIG. 3, at the destination host device 330, packets from each flow may be received at the corresponding destination ports 334 and passed to the second destination transport protocol (e.g., SRD) module. The SRD transport protocol module may cause an acknowledgement signal to be transmitted to the source SRD transport protocol module for each packet that has been received at the destination SRD transport protocol module. The destination SRD transport protocol module may determine, based on the SRD sequence numbers of the received packets, whether a packet was dropped. A timer may be implemented at the source network interface device 315, for example by the second source transport protocol (e.g., SRD) module, to determine the time between when a packet was transmitted and when an acknowledgment for that packet was received. For example, the SRD timer may cause the source SRD transport protocol module to retransmit a packet when an acknowledgement is not received from the destination SRD transport protocol module within about one millisecond (e.g., an SRD timeout). Conversely, a TCP timeout may be in a range of 50 ms.

The destination SRD transport protocol module may cause the received packets to be reordered. The destination SRD transport protocol module may then remove the SRD encapsulation by removing the SRD headers, reorder the packets, and pass the ordered packets to the first destination transport protocol (e.g., TCP) module 337. The destination TCP transport protocol module may remove the TCP formatting and pass the data to the destination application. Adding the SRD transport protocol may provide improved performance in terms of latency for TCP by providing faster recovery from internal network errors faster detection and retransmission of dropped packets. In addition, the SRD transport protocol may provide fewer packet drops in congested networks for UDP.

While various implementations may be described with respect to TCP and SRD transport protocols, transport protocols other than TCP, UDP, or SRD may be implemented by the first and second protocol modules without departing from the scope of the present disclosure.

Figure 6:
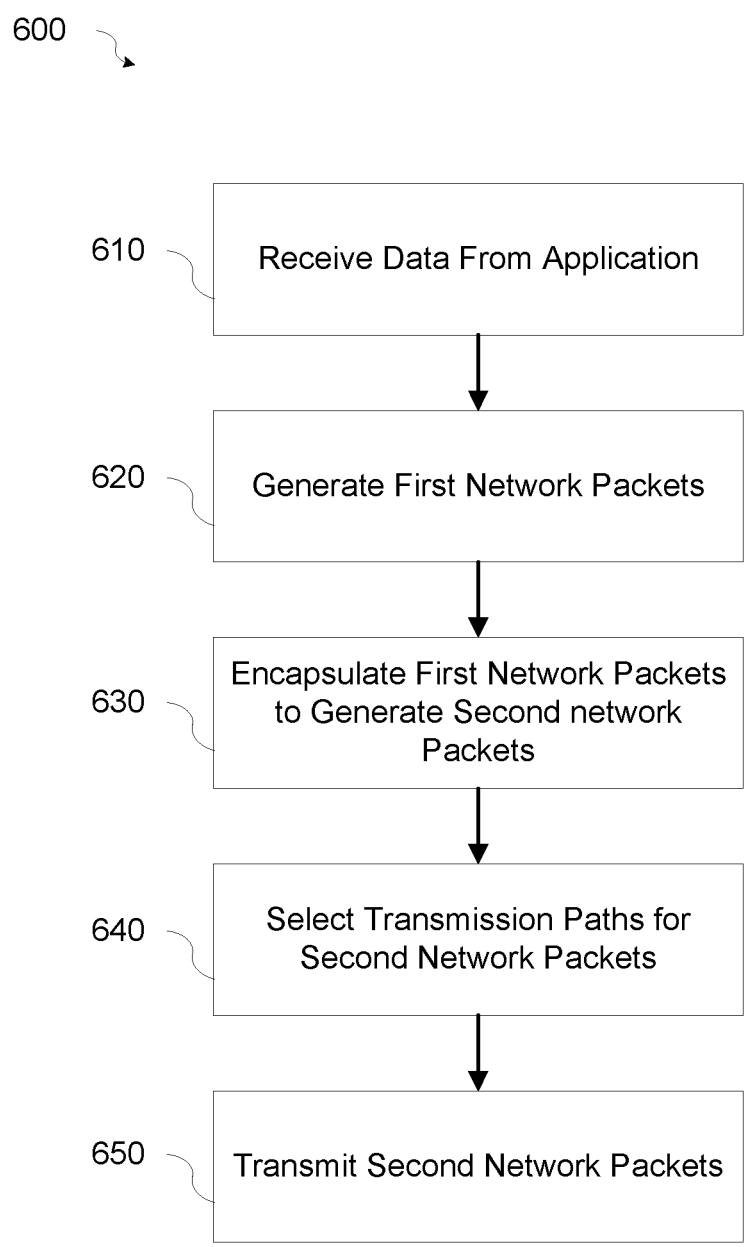
FIG. 6 is a flowchart illustrating an example of a method for providing a reliable transport protocol according to aspects of the present disclosure.

FIG. 6 is a flowchart illustrating an example of a method 600 for providing a reliable transport protocol according to aspects of the present disclosure. Some or all of the method 600 (or any other processes described herein, or variations, and/or combinations thereof) may be performed under the control of one or more computer systems, for example, but not limited to the example systems illustrated in FIGS. 1, 3, 5, and 8, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In some implementations, some portions of the method 600 may be performed by a host device (e.g., the source host device 310 in FIG. 3) while other portions of the method 600 may be performed by a host network interface device (e.g., the source host network interface device 315 in FIG. 3). For example, operations related to generation of the first network packets according to the first transport protocol may be performed by the host device. Operations related to encapsulation of the first network packets according to the second transport protocol to generate second network packets and transmission of the second network packets may be performed by the network interface device.

In other implementations, operations related to generation of the first network packets according to the first transport protocol and operations related to encapsulation of the first network packets according to the second transport protocol to generate second network packets may be performed by the host device. Transmission of the second network packets may be performed by the network interface device.

In still other implementations, operations related to generation of the first network packets according to the first transport protocol and operations related to encapsulation of the first network packets according to the second transport protocol to generate second network packets, as well as transmission of the second network packets may be performed by the network interface device.

Referring to FIG. 6, at block 610, data may be received from an application executing on a source device. An application executing on a source device, for example, a computer system or other network device, may generate data to be transmitted over a network to an application executing on a destination device. The data from the application may be received by a first transport protocol module implemented by a network interface device, for example, the network interface device 315. The first transport protocol module may implement a first transport protocol, for example, but not limited to, TCP, and may expose a standard interface, for example, a standard Ethernet interface or other interface, to the application executing on the source device. From the perspective of the application, the data may appear to be transmitted via a standard Ethernet device.

At block 620, the data received from the application may be encapsulated by the first transport protocol module, for example, the first transport protocol module 317, according to the first transport protocol. For example, the first source transport protocol module 317 may format the data into a packet payload and add packet header information including first sequence numbers to the first packets according to the first transport protocol. The first sequence numbers may indicate the order that should be maintained by the first packets. The first transport protocol may be, for example, TCP, and the first sequence numbers are TCP sequence numbers. The encapsulation by the first transport protocol module may generate first network packets.

At block 630, the first network packets may be encapsulated by a second transport protocol to generate second network packets. For example, the second source transport protocol module 319 may encapsulate the first network packets according to the second transport protocol. As part of the encapsulation, the second source transport protocol module 319 may add more header information to each first network packet including a flow identification (flow ID) and second sequence numbers according to the second transport protocol. The second transport protocol may be, for example, SRD, and the second sequence numbers provide SRD sequence numbers for the flow corresponding to the flow ID.

At block 640, transmission paths for the second network packets may be selected. The source network interface device 315 may cause the second network packets to be distributed between one or more source ports, for example, source ports 314, for packet flows over different paths across the network (e.g., switch fabric 320). Various distribution algorithms may be used to distribute the second network packets between the different paths to maintain reliable transmission and delivery of the second network packets to the destination. For example, packets can be assigned to paths with the lowest utilization first to balance the load on the different paths to improve bandwidth utilization. As another example, packets being retransmitted can be assigned to the fastest path to minimize the delivery latency of the packet. The second transport protocol may establish connections between source ports 314 and destination ports. In some implementations, the source port number to which a second network packet is assigned may be used to initially determine the path through the network for the second network packet.

At block 650, the second data packets may be transmitted across the network. As described with respect to FIG. 5, the second transport protocol may manage multiple paths for transmission of the second network packets across the network.

The source network interface device may implement a transmission timer, for example, by the second source transport protocol (e.g., SRD) module, to determine the time between when a network packet was transmitted and when an acknowledgment including the second sequence number for that network packet was received from a destination device. For example, transmission timer may cause the source transport protocol module to retransmit a network packet when an acknowledgement is not received from the destination device with the corresponding second sequence number within about one millisecond (e.g., an SRD timeout). Conversely, a TCP timeout may be in a range of 50 ms. In some implementations, the timer can be set to different timeout durations depending on the application and/or any quality of service (QoS) agreement.

Figure 7:
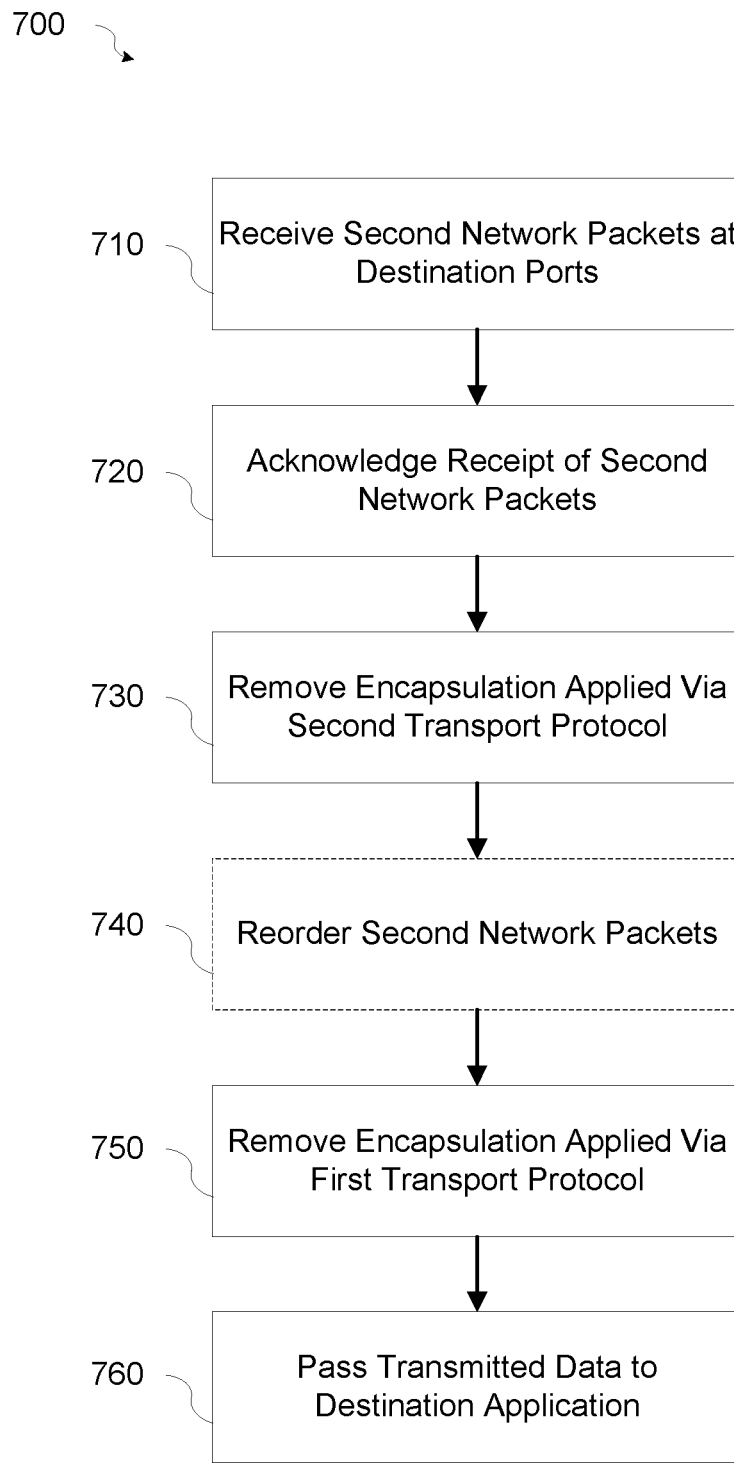
FIG. 7 is a flowchart illustrating an example of a method for receiving a network packet generated by a reliable transport protocol according to aspects of the present disclosure.

FIG. 7 is a flowchart illustrating an example of a method 700 for receiving a network packet generated by a reliable transport protocol according to aspects of the present disclosure. Some or all of the method 700 (or any other processes described herein, or variations, and/or combinations thereof) may be performed under the control of one or more computer systems, for example, but not limited to the example systems illustrated in FIGS. 1, 3, 5, and 8, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In some implementations, some portions of the method 700 may be performed by a host device (e.g., the destination host device 330 in FIG. 3) while other portions of the method 700 may be performed by a host network interface device (e.g., the destination host network interface device 335 in FIG. 3). For example, operations related to receiving the second network packets and removing the second network protocol encapsulation to expose the first network packets may be performed by the host network interface device. Operations related to stripping the formatting of the first network packets according to the first transport protocol may be performed by the host network device.

In other implementations, operations related to removing the second network protocol encapsulation to expose the first network packets and operations related to stripping the formatting of the first network packets according to the first transport protocol may be performed by the host network device. Receiving of the second network packets may be performed by the network interface device.

In still other implementations, operations related to removing the second network protocol encapsulation to expose the first network packets and operations related to stripping the formatting of the first network packets according to the first transport protocol, as well as transmission of the second network packets may be performed by the network interface device.

Referring to FIG. 7, at block 710, second network packets generated by a source network device may be received at destination ports, for example, destination ports 334, of a destination network device. The second network packets may be generated by the second transport protocol module (e.g., an SRD transport protocol module) of a source network device. The second network packets may be received over the network via one or more destination ports 334. The second network packets may traverse the network over different paths between the source ports and the destination ports. The second network packets may be forwarded to a second transport protocol module, for example the second transport protocol module 339, of the destination network device. The second transport protocol module 339 may be, for example, an SRD transport protocol module or another transport protocol module.

At block 720, upon receipt of each second network packet, the destination network device, for example the second transport protocol module 339 of the destination network device, may send an acknowledgement signal to the source network device indicating that the second network packets have been received. The acknowledgment signal for each second network packet may include the second sequence number of the corresponding second network packet. If an acknowledgment signal including the second sequence number of a network packet is not received by the source network device within a time period set by a transmission timer implemented in the source network device, the source network device may retransmit the corresponding network packet.

At block 730, the second transport protocol module may remove the encapsulation applied to the second network packets according to the second network transport protocol (e.g., the SRD transport protocol) to generate first network packets.

At block 740, depending on the first transport protocol, the second transport protocol module may optionally reorder the received second network packets, including any retransmitted network packets, for example, based on additional sequence numbers of the network packets, prior to passing the first network packets to the first transport protocol module. For example, when the first transport protocol is TCP, the reordering of the first network packets by reordering operations of block 740 may be performed. Since the first network packets were reordered by the second transport protocol module, the first network packets can be passed to the first transport protocol module in the correct order (e.g., in the order they were initially transmitted by the source network device). When the first transport protocol is UDP, packet reordering may be unnecessary and the reordering operations of block 740 may be skipped for at least some applications.

The first network packets may be passed to the first transport protocol module, for example, the first transport protocol module 337, of the destination device. At block 750, the first transport protocol module may remove the encapsulation applied to the first network packets according to the first network transport protocol (e.g., the TCP transport protocol) to recover the data transmitted by the application executing on the source network device.

At block 760, the first transport protocol module may pass the data to the destination application executing on the destination network device. The destination application may receive the data from the first transport protocol module via a standard interface, for example, a standard Ethernet interface or other interface, exposed to the application executing on the destination device. From the perspective of the application, the data may appear to be received via a standard Ethernet device.

Figure 8:
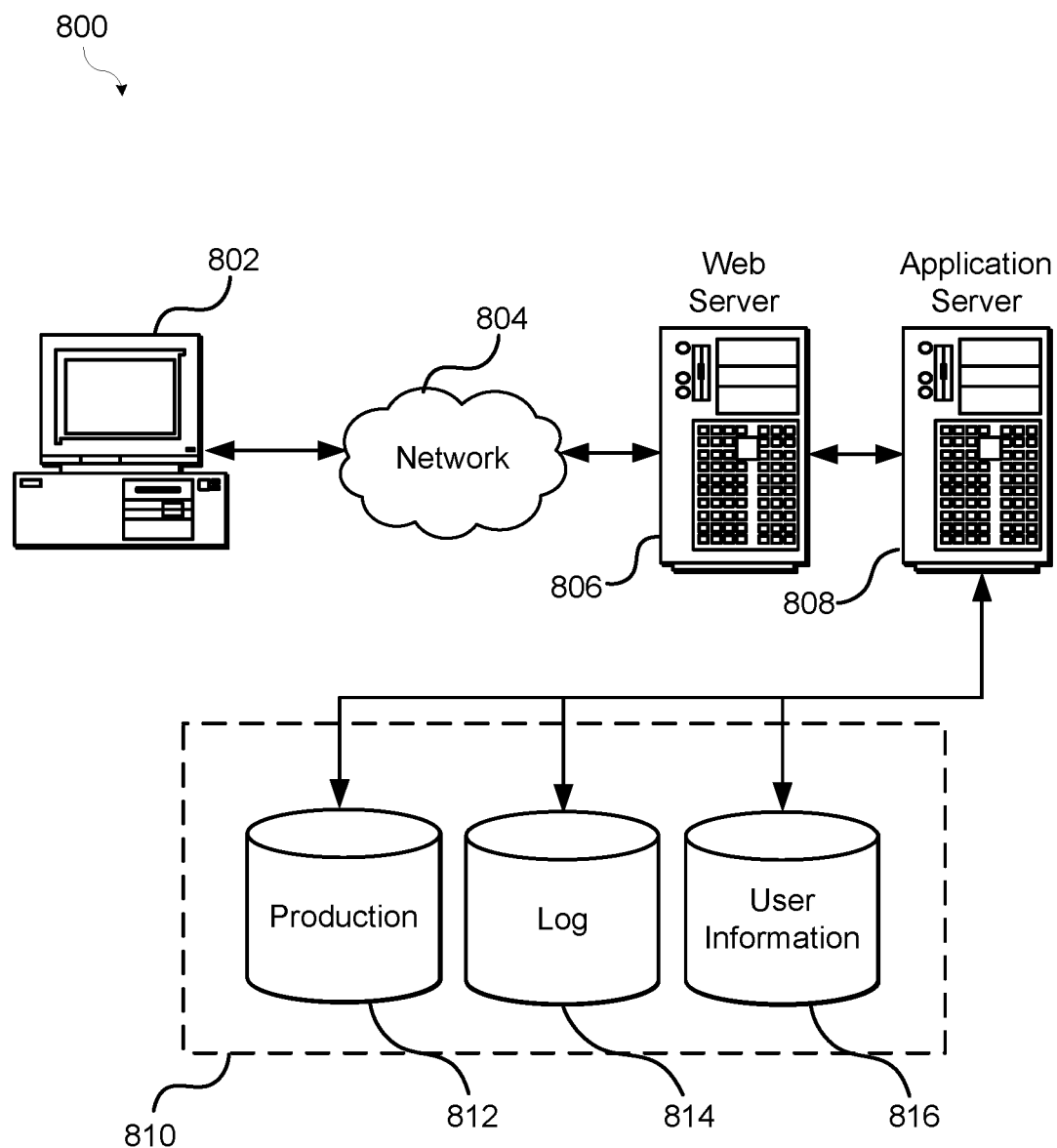
FIG. 8 is a diagram illustrating aspects of an example of an environment in which various embodiments can be implemented.

FIG. 8 is a diagram illustrating aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the example environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java©, C, C#, or C++, or any scripting language, such as Perl, Python, or TCL, as well as combinations thereof. The server(s) may also include database servers, including without limitation those commercially available from Oracle*, Microsoft*, Sybase*, and IBM©.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing system comprising:
a processor;
a memory coupled to and readable by the processor, wherein the memory is configured to store an application;
a first transport layer protocol module; and
a network interface device having a second transport layer protocol module and operable to communicate with a network,
wherein the first transport layer protocol module is configured to:
receive data from the application executing on the computing system; and
generate, based on the data from the application, first network packets according to a Transmission Control Protocol (TCP) or a User Datagram Protocol (UDP);
wherein the second transport layer protocol module is configured to:
receive the first network packets;
encapsulate the first network packets according to a Scalable Reliable Datagram (SRD) protocol to generate second network packets by adding a set of sequence numbers and path identifiers to the first network packets; and
transmit the second network packets to a destination device via a plurality of paths over a network; and
wherein a retransmission timeout period for the SRD protocol is shorter than a retransmission timeout period for the TCP.

2. The computing system of claim 1, wherein the second transport layer protocol module is configured to transmit second network packets having a same flow identifier via the plurality of paths.

3. The computing system of claim 1, wherein the second transport layer protocol module retransmits a packet over a different path than a path over which the packet was originally transmitted.

4. The computing system of claim 1, wherein the second transport layer protocol module is configured to provide the second network packets to the network via a set of output ports.

5. The computing system of claim 1, wherein the second transport layer protocol module is configured to provide the second network packets to the network over multiple paths via one output port.

6. An apparatus comprising:
a processor; and
a memory storing instructions, which when executed by the processor, cause the apparatus to:
encapsulate data received from an application according to a first transport layer protocol to form first packets;
encapsulate the first packets according to a second layer transport protocol to form second packets for a first packet flow;
select different paths for transmitting the second packets across a network to a destination device; and
transmit each packet via a path selected for a corresponding packet,
wherein a retransmission timeout period for the second transport layer protocol is shorter than a retransmission timeout period for the first transport layer protocol.

7. The apparatus of claim 6, further comprising:
a transport layer protocol module configured to encapsulate the first packets according to the second transport layer protocol,
wherein encapsulating the first packets comprises adding a packet flow identifier.

8. The apparatus of claim 7, wherein the transport layer protocol module is further configured to select different paths for transmitting the second packets having a same flow identifier.

9. The apparatus of claim 7, wherein encapsulating the first packets comprises adding a packet sequence number, and
wherein the packet sequence number indicates an order of transmission for the second packets.

10. The apparatus of claim 9, further comprising a transmission timer,
wherein the transport layer protocol module is further configured to retransmit a second packet having a given sequence number when a receipt acknowledgment for the second packet having the given sequence number is not received within a time period set by the transmission timer.

11. The apparatus of claim 6, wherein the processor is further configured to cause the apparatus to retransmit a second packet over a different network path when a receipt acknowledgment for the second packet is not received.

12. The apparatus of claim 6, wherein the processor is further configured to:
cause the apparatus to monitor transmission times of the second packets over different paths across the network; and
avoid transmitting the second packets over network paths having longer transmission times than other network paths.

13. The apparatus of claim 6, wherein the apparatus is further configured to:
receive the second packets via different paths across the network; and
reorder the second packets received out of order based on a sequence number of each second packet.

14. The apparatus of claim 6, wherein the first transport layer protocol is transport control protocol (TCP) or User Datagram Protocol (UDP), and
wherein the second transport layer protocol is Scalable Reliable Datagram (SRD) transport protocol.

15. A method, comprising:
encapsulating data received from an application according to a first transport layer protocol to form first packets;

encapsulating the first packets according to a second transport layer protocol to form second packets for a first packet flow;

selecting different paths for transmitting the second packets across a network to a destination device; and transmitting each packet via a path selected for the packet, wherein a retransmission timeout period for the second transport layer protocol is shorter than a retransmission timeout period for the first transport layer protocol.

16. The method of claim 15, further comprising:

selecting different paths for transmitting the second packets having a same flow identifier.

17. The method of claim 15, further comprising:

monitoring transmission times for the different paths; and selecting a path having a shortest transmission time for transmitting a next second packet.

18. The method of claim 15, further comprising:

monitoring transmission times for the different paths; and selecting a path according to network congestion based on flowlet status information and network conditions.

19. The method of claim 15, further comprising:

retransmitting a second packet over a different path when a receipt acknowledgment is not received within the retransmission time period.

20. The method of claim 15, further comprising:

receiving the second packets via different paths across the network; and reordering the second packets received out of order based on a sequence number of each second packet.

* * * * *